W. W. ROBINSON.
CUSHION RIM FOR PNEUMATIC TIRES.
APPLICATION FILED JAN. 11, 1915.

1,139,583.

Patented May 18, 1915.

WITNESSES—
Muriel D. Griffin
Sarah D. Eaton

INVENTOR—
Wallace W. Robinson
by Eginle Vernie
Attorney

UNITED STATES PATENT OFFICE.

WALLACE W. ROBINSON, OF PORTLAND, MAINE.

CUSHION-RIM FOR PNEUMATIC TIRES.

1,139,583.

Specification of Letters Patent.

Patented May 18, 1915.

Application filed January 11, 1915. Serial No. 1,526.

*To all whom it may concern:*

Be it known that I, WALLACE W. ROBINSON, a citizen of the United States, residing at Portland, in the county of Cumberland and State of Maine, have invented certain new and useful Improvements in Cushion-Rims for Pneumatic Tires, of which the following is a specification.

My invention relates to automobile wheels and particularly to means for preventing rim-cut or injury to the shoe by contact with the rim. As at present constructed, if the tire is suddenly deflated, especially while the machine is running, the shoe is pressed upwardly and outwardly against the metallic tire holding means, resulting often in injury to the shoe at the point where it is usually made of thinner material to give the necessary resiliency to the tire.

The object of the present invention is to provide means for preventing this injury.

Figures 1, 2:
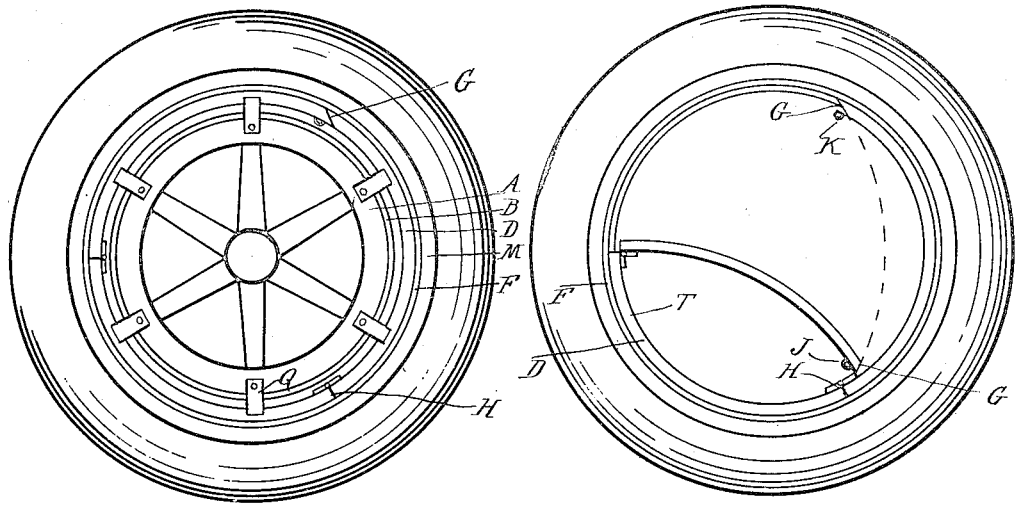
Figures 3, 5, 7:
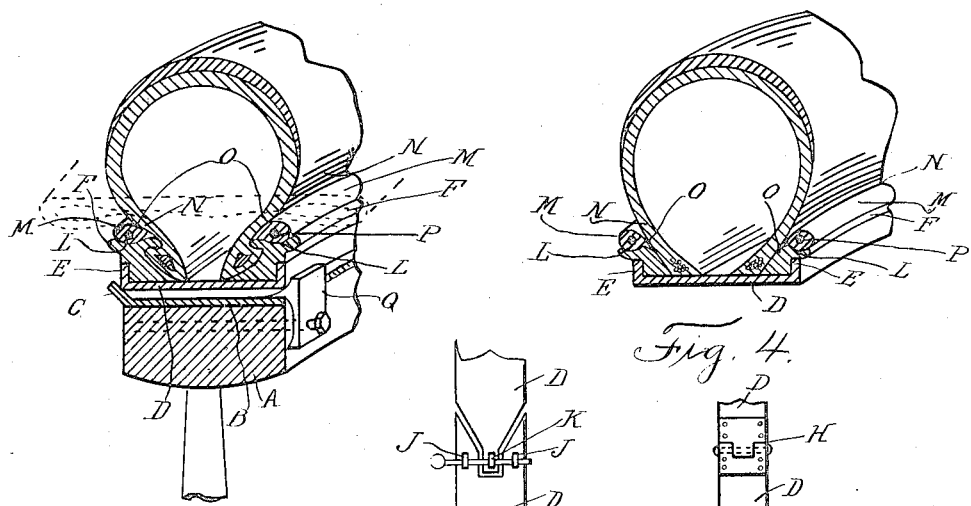
Figure 6:
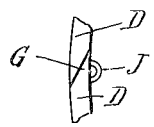

In the drawing herewith accompanying and making a part of this application Figure 1 is a side elevation of a wheel having my anti-rim cutting device applied thereto; Fig. 2 is a side elevation without the wheel and having the rim partially collapsed; Fig. 3 is a fragment in perspective showing a clencher rim shoe; Fig. 4 is a fragment in perspective of the device shown in Fig. 1; Fig. 5 is a detail of the overlapping joint of the rim; Fig. 6 is a side view of the same, and Fig. 7 is a detail of one of the hinge joints.

In said drawings the same reference characters indicate like parts in all the figures.

My invention is equally applicable to both the clencher and straight side shoes.

In said drawings A is the felly, B is the felly band having the flange C extending up from the inner side thereof, the felly proper and the felly band being hereinafter designated the wheel. Adapted to be mounted upon the wheel is a demountable rim D which in the form shown is provided on each side with flanges E to retain the shoe holding rings F. The rim shown is made in sections having overlapping faces G and hinged joints H whereby the rim may be removed from the shoe by merely unlocking the rim at the overlapping faces, which may be done by removing the pin I from loops J on one section of the rim and loop K on the other section of the rim, permitting the section to drop in as shown in Fig. 2, the rim falling freely away from the shoe holding rings. The rings or flanges of the rim, as the case may be, which engage the sides of the shoe, are provided with slightly concave seats L in which are mounted resilient rings M which may be of any suitable material or structure, as rubber, which lie adjacent the parts N of the shoe. These rings M form with the top of the holding rings or flanges of the rim preferably an unbroken easy curve O around which the shoe bends when deflated and collapsed, thus preventing the shoe from being injured by contact with the holding rings or flanges of the rim. The rings M are held upon their seats by the natural resiliency of the material of which they are made, and they may be further strengthened by a central core of wire P. The demountable rim is held upon the wheel in the usual way, as by wedges Q.

The operation of my improved rim and shoe guard is as follows: The anti-cutting rings are placed in their seats before the inner tube is inflated. The inner tube is then inflated. Now if the inner tube is deflated the shoe drops down, folding around the anti-cutting rings with an easy curve which is large enough to prevent sharp folding of the shoe at these points and is supported upon the anti-cutting rings, as shown in the dotted line in Fig. 3 instead of upon the metal holding rings or flanges of the rim.

I have shown my invention as applied to straight side and clencher type of rims and I wish it to be understood that the scope of the claims is not limited to the form shown but includes broadly any metallic means for holding the shoe upon the rim proper, whether integral with the rim or additional thereto.

I claim:

1. In a device of the character described, a tire retaining flange provided with a radially outwardly extending retaining wall on the outside thereof, a resilient ring located on said flange inside of and projecting radially beyond said wall, whereby when the tire is deflated and collapsed it folds around said ring.

2. In a device of the character described, a tire retaining flange provided with a ring receiving recess on the outside and a resilient ring located in said recess and projecting above the sides of the recess, whereby, when the tire is deflated and collapsed, it folds around said ring.

In testimony whereof I affix my signature in presence of two witnesses.

WALLACE W. ROBINSON.

Witnesses:
ELGEN C. VARRILL,
CHARLES L. FOSTER.